United States Patent
van den Berg et al.

(10) Patent No.: US 6,267,077 B1
(45) Date of Patent: Jul. 31, 2001

(54) CLEANING IMPLEMENT FOR CLEANING WITH A RINSING LIQUID AT LEAST PART OF A MILKING MACHINE

(75) Inventors: Karel van den Berg, Bleskensgraaf; Rudolf E. van der Laan, Neer, both of (NL)

(73) Assignee: Maasland N.V. a Dutch Limited Co, Maasland (NL)

( * ) Notice: Subject to any disclaimer, the term of this patent is extended or adjusted under 35 U.S.C. 154(b) by 0 days.

(21) Appl. No.: 09/372,080

(22) Filed: Aug. 9, 1999

Related U.S. Application Data

(63) Continuation of application No. PCT/NL98/00690, filed on Dec. 4, 1998.

(30) Foreign Application Priority Data

Aug. 12, 1997 (NL) .................................................. 1007727

(51) Int. Cl.[7] .................................. A01J 3/00; A01J 5/00
(52) U.S. Cl. ...................................... 119/14.01; 119/14.18
(58) Field of Search ............................. 119/14.01, 14.08, 119/14.18, 670

(56) References Cited

U.S. PATENT DOCUMENTS

| | | | |
|---|---|---|---|
| 2,558,628 | * 6/1951 | Redin | 119/14.01 |
| 2,714,893 | * 8/1955 | Zimmer | 119/14.01 |
| 2,717,576 | * 9/1955 | Hansen | 119/14.01 |
| 4,061,504 | * 12/1977 | Zall et al. | 119/14.18 |
| 4,168,677 | * 9/1979 | Brown | 119/14.18 |
| 4,175,514 | * 11/1979 | Souza et al. | 119/14.08 |
| 5,862,776 | * 1/1999 | Van Den Berg | 119/14.18 |
| 6,089,242 | * 7/2000 | Buck | 119/14.18 |

\* cited by examiner

*Primary Examiner*—Charles T. Jordan
*Assistant Examiner*—Elizabeth Shaw
(74) *Attorney, Agent, or Firm*—Penrose Lucas Albright

(57) ABSTRACT

A cleaning apparatus and method for cleaning components of automated milking apparatus which includes milking machines which are automatically connected and disconnected to the animals being milked. A rinsing liquid supply line supplies water through a protecting device and a heat exchanger to a junction which has a line leading to a rinsing liquid reservoir which includes a heating element to provide heat cleaning if desired, a line connected to a metering device to introduce an additive such as an alkali or acid, a branch line for rinsing components of the automatic milking machine such as teat cups and a branch line leading through non-return devices to a rinsing liquid buffer reservoir which can be pressurized by air pressure and used for cleansing components such as the teat cups and sensor on a robot arm and the device for cleaning the udders and teats of the animals being milked. Computer-controlled valving is provided for each of the branch lines for cleaning milking components of the automatic milking system, the rinsing liquid supply before the juncture and in the line to the rinsing liquid reservoir, as well as the rinsing liquid discharge line leading to the rinsing liquid buffer reservoir.

33 Claims, 1 Drawing Sheet

CLEANING IMPLEMENT FOR CLEANING WITH A RINSING LIQUID AT LEAST PART OF A MILKING MACHINE

RELATED APPLICATION

This is a continuation of International Application No. PCT/NL98/00690, filed Dec. 4, 1998.

FIELD OF THE INVENTION

The invention relates to an apparatus for cleaning with a rinsing liquid at least part of one or more components of one or more milking machines for milking animals, said apparatus being provided with a rinsing liquid reservoir which is connected a rinsing liquid supply line wherein a first shut-off valve is included.

BACKGROUND OF THE INVENTION

Such cleaning apparatus which utilizes a rinsing liquid for cleaning purposes is known.

With such cleaning apparatus an additive is introduced, such as a base or an acid, to the rinsing liquid, usually in the rinsing liquid reservoir. Parts of the milking machine are cleaned with this solution. After a part of the machine has been cleaned with such a solution, said part is usually rinsed with a rinsing liquid in which no additives have been dissolved. For that purpose the rinsing liquid reservoir is filled again, whereafter the rinsing process can start. Filling again the rinsing liquid reservoir requires a great deal of time, while cleaning of the rinsing liquid reservoir itself is difficult.

An object of the invention is to obviate the above-mentioned drawbacks or at least minimize them.

SUMMARY OF THE INVENTION

In accordance with the invention, the above object of the invention is achieved by providing a connection to the rinsing liquid supply line, between the first shut-off valve and the rinsing liquid reservoir, a first rinsing liquid discharge line in which a second shut-off valve is included, while the cleaning apparatus for cleaning with a rinsing liquid is further provided with a first metering device for adding an additive, such as e.g. a cleaning or disinfecting liquid or both to the liquid that has been supplied via the rinsing liquid supply line, the additive being introduced in the rinsing liquid supply line, preferably between the reservoir and the first shut-off valve, or in the first rinsing liquid discharge line, or both. The additive can also be introduced into the rinsing liquid discharge line before the first shut-off valve. By introducing the additive to the rinsing liquid directly in the rinsing liquid discharge line, the rinsing liquid reservoir is prevented from coming into contact with the additive. According to again another inventive feature, a third shut-off valve is included in the rinsing liquid supply line, between the rinsing liquid reservoir and the place where the first rinsing liquid discharge line is connected to the rinsing liquid supply line. This third shut-off valve makes it possible to close the rinsing liquid reservoir relative to the rest of the lines, so that the rinsing liquid can be introduced into the reservoir for the purpose of heat cleaning, while via the rinsing liquid supply line other parts of the milking machine can be cleaned with rinsing liquid. However, for the purpose of cleaning, such as descaling, the rinsing liquid reservoir, it is possible to introduce, by means of the metering device, an additive to the rinsing liquid that flows into the rinsing liquid reservoir.

According to an inventive feature, the additive is introduced at the place where the first rinsing liquid discharge line is connected to the rinsing liquid supply line. By introducing the additive at this juncture, only one connection between the metering device and the rinsing liquid lines is required, inasmuch as the flow direction of the rinsing liquid can be used either for conveying the additive to the rinsing liquid reservoir or for discharging the additive via the further rinsing liquid discharge line.

According to again another inventive feature, the first and second shut-off valves are integrated in a so-called three-way valve. According to a further inventive feature, in the situation that a three-way valve is applied, seen in the flow direction of the liquid supplied via the rinsing liquid supply line before the three-way valve, a connection is provided between the rinsing liquid supply line and the first rinsing liquid discharge line, in which connection a further shut-off valve is included.

In accordance with yet another inventive feature, the first rinsing liquid discharge line branches off in at least one further rinsing liquid discharge line in which a shut-off valve is included. This branching off enables other components of the milking machine to come into contact with the cleaning apparatus for cleaning with a rinsing liquid for the purpose of being cleaned. According to again a still further inventive feature, there is included a rinsing liquid buffer reservoir in at least one rinsing liquid discharge line. According to a still further inventive feature, to the rinsing liquid buffer reservoir is connected a pressure line, preferably a compressed air line, by means of which the liquid in the rinsing liquid buffer reservoir can be pressurized. In this manner certain components of the milking machine can be cleaned at a higher pressure. In a preferred embodiment of the invention, in the rinsing liquid buffer reservoir or the rinsing liquid supply line or the rinsing liquid reservoir, or any combination thereof, a sensor is provided by means of which the concentration of the additive in the rinsing liquid can be determined. In this manner a rinsing liquid may be produced with a proper concentration of additive, so that an optimal cleaning or disinfection or both of components of the milking machine can take place. In order to avoid that the pressurization of the liquid in the rinsing liquid buffer reservoir influences the rinsing liquid circuit, a non-return valve is provided in the rinsing liquid discharge line above the rinsing liquid buffer reservoir. In order to prevent the rinsing liquid from being contaminated, according to an inventive feature, a filter is included in the rinsing liquid discharge line.

In accordance with another inventive feature, it is possible to connect to the further rinsing liquid supply line at least one milking robot for automatically connecting teat cups to an animal to be milked, or a cleaning device for the cleaning of cleaning members by means of which the teats or the udder or both of an animal to be milked are cleaned, or a further cleaning device by means of which at least part of the robot arm is cleaned, or a combination of such components.

For the purpose of pre-heating the rinsing liquid, such as water, there is included a heat exchanger in the rinsing liquid supply line. By means of the heat exchanger the heat which is released during cooling of the milk can be used for heating the rinsing liquid. According to a preferred embodiment of the invention, included in the rinsing liquid supply line is a protecting device for preventing the rinsing liquid from flowing into the rinsing liquid supply line in the direction opposite to that towards the rinsing liquid reservoir. In this manner it is possible to prevent the water supply from being contaminated with rinsing liquid to which additives have been added.

The invention further relates to a milking machine comprising cleaning apparatus for cleaning with a rinsing liquid as described above.

The invention also relates to the method of the above-described apparatus, in which method rinsing liquid is supplied to a rinsing liquid reservoir via a rinsing liquid supply line, and the rinsing liquid can optionally be heated, after which, by means of a metering device, an additive, such as an acid or a base, is added to the rinsing liquid, optionally to a part thereof or to all the rinsing liquid in a rinsing liquid discharge line connected to the rinsing liquid reservoir, whereafter at least part of the milking machine is cleaned with the rinsing liquid.

The invention further relates to a method of cleaning at least part of the milking machine, in which method rinsing liquid is supplied to a rinsing liquid reservoir via a rinsing liquid supply line, and the rinsing liquid can optionally be heated, after which, by means of a metering device, an additive, such as an acid or a base, is introduced into the rinsing liquid, optionally to a part thereof or to all the rinsing liquid in a rinsing liquid discharge line connected to the rinsing liquid reservoir. The invention also relates to a method in which, by means of the metering device, an additive, such as an acid, is introduced into the rinsing liquid supply line. The latter measure makes it possible to descale the rinsing liquid reservoir.

According to a further inventive feature, all the valves, shut-off valves or protecting devices, or the metering device, or a selected combination thereof, are computer-controlled.

The invention will now be explained in further detail with reference to an accompanying drawing, in which:

DETAILED DESCRIPTION OF THE PREFERRED EMBODIMENTS

Figure 1:
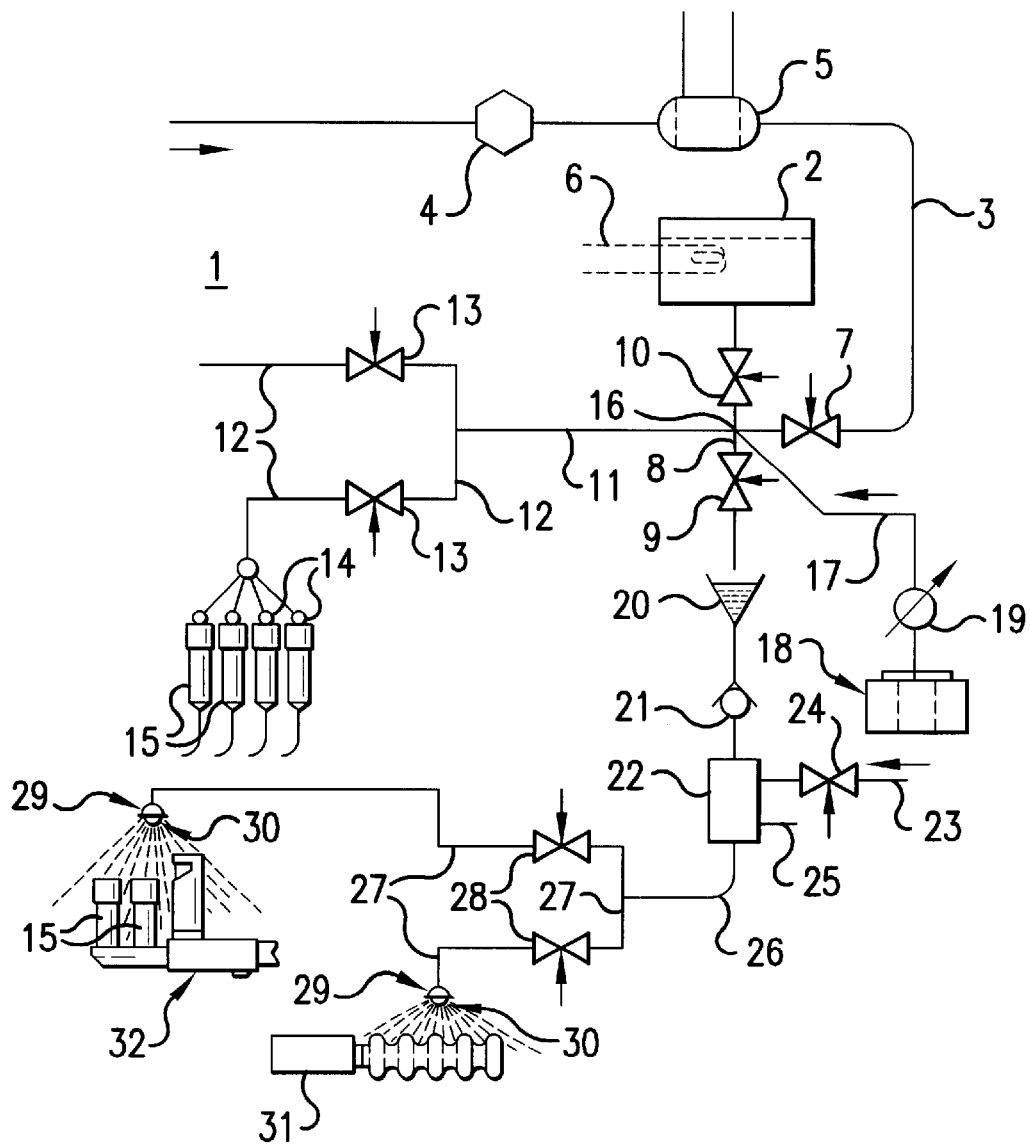
FIG. 1 shows schematically an arrangement of a cleaning apparatus in accordance with the invention.

The cleaning apparatus 1 for cleaning with a rinsing liquid comprises a rinsing liquid reservoir 2 to which a rinsing liquid supply line 3 is connected. The rinsing liquid supply line 3 per se can be connected to the water supply. In the rinsing liquid supply line there is included a protecting device 4 for the purpose of preventing the rinsing liquid from flowing into the rinsing liquid supply line 3 in the direction opposite to that towards the rising liquid reservoir 2. In the rinsing liquid supply line 3 there is further included a heat exchanger 5 by means of which the rinsing liquid can be heated. Heat exchanger 5 can make use of the heat which is released during cooling of the milk. In the rinsing liquid reservoir 2 there is further included a heating element 6 by means of which the rinsing liquid present in the reservoir 2 can be heated. The rinsing liquid which is heated can be used for a heat cleaning process well known in the art.

In the rinsing liquid supply line 3 is further included a first shut-off valve 7. Rinsing liquid supply line 3 is further connected to a first rinsing liquid discharge line 8 in which a second shut-off valve 9 is included. Between first shut-off valve 7 and rinsing liquid reservoir 2 is a third shut-off valve 10 in rinsing liquid supply line 3. Where the first rinsing liquid discharge line 8 is connected to the rinsing liquid supply line 3 a further rinsing liquid discharge line 11 is provided which divides into two lines 12, each of which is provided with a fourth shut-off valve 13. At the ends of lines 12 are coupling elements 14 that can be connected to teat cups 15 of a milking machine. Via coupling elements 14, rinsing liquid can be supplied to teat cups 15 and milk lines connected thereto. A milking cluster may be connected to the other line 12, while additional lines 12 may branch off from the further rinsing liquid discharge line 11 for the purpose of cleaning still further parts of the milking machine.

At the line juncture 16, where first rinsing liquid discharge line 8 and further rinsing discharge lines 11 are connected to rinsing liquid supply line 3, is also joined a further line 17 of a metering device 18 by means of which an additive, such as a base or an acid, can be introduced into the rinsing liquid. Metering device 18 comprises a computer-controlled metering unit 19. In first rinsing liquid discharge line 8 a filter 20 and a non-return valve 21, as well as a rinsing liquid buffer reservoir 22 are included. The rinsing liquid buffer reservoir comprises a supply line 23 via which additives can be supplied to rinsing liquid buffer reservoir 22. Supply line 23 can be shut off by means of a fifth shut-off valve 24. To supply line 23 a similar metering device as the metering device 18 may be connected. To the rinsing liquid buffer reservoir 22 a pressure line 25 is connected, by means of which rinsing liquid buffer reservoir 22 and a rinsing liquid present therein can be pressurized. Rinsing liquid buffer reservoir 22 is further provided with a rinsing liquid buffer discharge line 26 which branches off in two further lines 27 in the present embodiment. The number of further lines 27 which may be provided depends on the number of components to be cleaned in the milking machine. Each further line 27 is provided with a sixth shut-off valve 28. At the ends of each of further lines 27 is a cleaning device 29 by means of which a component of the milking machine can be cleaned with rinsing liquid. In the present embodiment each cleaning device 29 comprises a spray nozzle 30. On the one hand by means of cleaning device 29 a cleaning member 31 is, itself, cleaned that is adapted to clean the teats of the animal, while by means of the other cleaning member a part of a robot arm 32 of a milking robot is cleaned.

Cleaning apparatus 1 for cleaning with a rinsing liquid operates as follows:

Via rinsing liquid supply line 3 water is supplied to reservoir 2. By means of liquid level sensors, the amount of water in reservoir 2 is determined. After a sufficient quantity of water has been supplied to rinsing liquid reservoir 2, the water is heated by means of heating elements 6. The water temperature depends on the type of cleaning process to be used. When heat cleaning is applied, the water temperature is above 70° C. During heating of the rinsing liquid in rinsing liquid reservoir 2 other parts of the milking machine can be cleaned with rinsing liquid via rinsing liquid supply line 3, depending on which shut-off valves are closed and opened. Furthermore, it is possible to supply proportionally by means of the metering device 18 an additive, such as chlorine, acid, base, etc., to the rinsing liquid during the cleaning process. To rinsing liquid buffer reservoir 22 an additive, such as sodium hypochlorite, can also be supplied via supply line 23. This mixture can be pressurized via compressed air line 25. Via further lines 27 and spray nozzles 30 it is possible to clean and disinfect cleaning member 31 and robot arm 32 by applying fluid from reservoir 22 at a high pressure.

Although we have disclosed the preferred embodiments of our invention, it is to be understood that it is capable of other adaptations and modifications within the following claims:

Having disclosed our invention, what we claim as new and to be secured by Letters Patent of the United States of America is:

1. A cleaning apparatus for cleaning with a rinsing liquid at least part of a component of a milking machine for milking animals, said cleaning apparatus for cleaning with a rinsing liquid being provided with a rinsing liquid reservoir to which is connected a rinsing liquid supply line in which a first shut-off valve is included, to said rinsing supply line, between said first shut-off valve and said rinsing liquid reservoir, a first rinsing liquid discharge line is connected in which a second shut-off valve and a rinsing liquid buffer reservoirs are included, said cleaning apparatus being further provided with a first metering device for introducing a cleansing additive to the rinsing liquid that has been supplied via said rinsing liquid supply line, said additive being introduced in said rinsing liquid supply line between aid rinsing liquid reservoir and said first shut-off valve.

2. A cleaning apparatus for cleaning with a rinsing liquid in accordance with claim 1, comprising a third shut-off valve disposed between said rinsing liquid reservoir and a place where said first rinsing liquid discharge line is connected to said rinsing liquid supply line.

3. A cleaning apparatus in accordance with claim 1, wherein said cleansing additive comprises a cleaning liquid.

4. A cleaning apparatus in accordance with claim 1, wherein said cleansing additive comprises a disinfecting liquid.

5. A cleaning apparatus in accordance with claim 1, wherein said cleansing additive comprises the combination of a cleaning liquid and a disinfecting liquid.

6. A cleaning apparatus in accordance with claim 1, wherein said cleansing additive is introduced into said rinsing liquid supply line between said rinsing liquid reservoir, said first shut-off valve, and said first rinsing liquid discharge line.

7. A cleaning apparatus in accordance with claim 1, wherein said cleansing additive is introduced into said rinsing liquid at a place where said first rinsing discharge line is connected to said rinsing liquid supply line.

8. A cleaning apparatus in accordance with claim 1, wherein said first shut-off valve and said second shut-off valve are integrated to comprise a three-way valve.

9. A cleaning apparatus in accordance with claim 8, wherein upstream relative to liquid supplied via said rinsing liquid supply line before said three-way valve is provided a connection between said rinsing liquid supply line and said first rinsing liquid discharge line, a further shut-off valve being included proximate said connection in said first rinsing liquid discharge line.

10. A cleaning apparatus in accordance with claim 1, comprising a further rinsing liquid discharge line which branches off of said first rinsing liquid discharge line.

11. A cleaning apparatus in accordance with claim 1, wherein said rinsing liquid buffer reservoir is included in said further rinsing liquid discharge line.

12. A cleaning apparatus in accordance with claim 11, comprising a pressure line connected to said rinsing liquid buffer reservoir by means of which the liquid in said rinsing liquid buffer reservoir can be pressurized.

13. A cleaning apparatus in accordance with claim 12, wherein said pressure line comprises a compressed air line.

14. A cleaning apparatus in accordance with claim 1, which comprises a pressure line which is connected to said rinsing liquid buffer reservoir by means of which the liquid in said rinsing liquid buffer reservoir can be pressurized.

15. A cleaning apparatus in accordance with claim 14, wherein said pressure line comprises a compressed air line.

16. A cleaning apparatus in accordance with claim 1, which comprises a sensor for sensing the concentration of said additive which has been received in said rinsing liquid supply line from said first metering device.

17. A cleaning apparatus in accordance with claim 16, comprising a rinsing liquid buffer reservoir in said first rinsing liquid discharge line, said sensor being associated with said rinsing liquid buffer reservoir.

18. A cleaning apparatus in accordance with claim 16, which comprises a further rinsing liquid discharge line which branches off from said first rinsing liquid discharge line, said sensor being associated with said further rinsing liquid discharge line.

19. A cleaning apparatus in accordance with claim 16, wherein said sensor is associated with said rinsing liquid reservoir.

20. A cleaning apparatus in accordance with claim 1, comprising a non-return valve which is provided in said first rinsing liquid discharge line above said rinsing liquid buffer reservoir.

21. A cleaning apparatus in accordance with claim 1, which comprises a filter which is included in said first rinsing liquid discharge line.

22. A cleaning apparatus in accordance with claim 1 in combination with apparatus for automatically milking animals which includes components comprising cleaning means for cleaning the teats and udder of an animal being milked, teat cups and a sensor for sensing the location of the animal's teats for the automated connection of said teat cups to said teats, means for pressurizing rinsing liquid received in said first rinsing liquid discharge line and means for cleaning said teat cups, said sensor, and said cleaning means by spraying pressurized rinsing liquid thereon to which said cleansing additive has been introduced.

23. A cleaning apparatus in accordance with claim 1, comprising a heat exchanger in said rinsing liquid supply line.

24. A cleaning apparatus in accordance with claim 1, comprising a protecting device for preventing said rinsing liquid from flowing from said first rinsing liquid discharge line into said rinsing liquid reservoir.

25. A method of cleaning at least part of a milking machine, in which method rinsing liquid is supplied to a rinsing liquid reservoir via a rinsing liquid supply line, selectively heating said rinsing liquid in said rinsing liquid reservoir, introducing an additive, comprising an acid or a base selectively to all or part of said rinsing liquid via a rinsing liquid discharge line that leads from the rinsing liquid reservoir, and selectively pressurizing and spraying said rinsing liquid on exterior parts of the milking machine.

26. A method in accordance with claim 25, comprising the metering of said additive into said liquid supply line by means of a metering device.

27. A cleaning apparatus for cleaning with a rinsing liquid at least part of a component of a milking machine for milking animals, said cleaning apparatus for cleaning with a rinsing liquid being provided with a rinsing liquid reservoir to which is connected a rinsing liquid supply line in which a first shut-off valve is included, to said rinsing liquid supply line, between said first shut-off valve and said rinsing liquid reservoir, a first rinsing liquid discharge line is connected in which a second shut-off valve is included, said cleaning apparatus further provided with a first metering device for introducing a cleansing additive to the rinsing liquid that has been supplied via said rinsing liquid supply line, said additive being introduced in said rinsing liquid supply line between said rinsing liquid reservoir, said first shut-off valve, and said first rinsing liquid discharge line.

28. A cleaning apparatus for cleaning with a rinsing liquid at least part of a component of a milking machine for milking animals, said cleaning apparatus for cleaning with a rinsing liquid being provided with a rinsing liquid reservoir to which is connected a rinsing liquid supply line in which a first shut-off valve is included, to said rinsing liquid supply line, between first shut-off valve and said rinsing liquid reservoir, a first rinsing liquid discharge line is connected in which a second shut-off valve is included, said cleaning apparatus being further provided with a further metering device for introducing cleansing additive, to the rinsing liquid that has been supplied via said rinsing liquid supply line, said additive being introduced in said rinsing liquid supply line between said rinsing liquid reservoir and said first shut-off valve, said cleansing additive being introduced in said rinsing liquid at a place where said first rinsing discharge line is connected to said rinsing liquid supply line.

29. A cleaning apparatus for cleaning with a rinsing liquid at least part of a component of a milking machine for milking animals, said cleaning apparatus for cleaning with a rinsing liquid being provided with a rinsing liquid reservoir to which is connected a rinsing liquid supply line in which a first shut-off valve is included, to said rinsing liquid supply line, between said first shut-off valve and said rinsing liquid reservoir, a first rinsing liquid discharge line is connected in which a second shut-off valve is included, said cleaning apparatus being further provided with a first metering device for introducing a cleansing additive to the rinsing liquid that has been supplied via said rinsing liquid supply line, said additive being introduced in said rinsing liquid supply line between said rinsing liquid reservoir and said first shut-off valve, and a sensor being provided for sensing the concentration of said additive which has been received in said rinsing liquid supply line from said metering device.

30. A cleaning apparatus in accordance with claim 29 comprising a rinsing liquid buffer reserve in said first rinsing discharge line, said sensor being associated with said rinsing liquid buffer reserve.

31. A cleaning apparatus in accordance with claim 29, which comprises a further rinsing liquid discharge line which branches off from said first rinsing liquid discharge line, said sensor being associated with said further rinsing liquid discharge line.

32. A cleaning apparatus in accordance with claim 29, wherein said sensor is associated with said rinsing liquid reservoir.

33. A cleaning apparatus for cleaning with a rinsing liquid at least part of a component of a milking machine for milking animals, said cleaning apparatus for cleaning with a rinsing liquid being provided with a rinsing liquid reservoir to which is connected a rinsing liquid supply line in which a first shut-off valve is included, to said rinsing liquid supply line, between said first shut-off valve and said rinsing liquid reservoir, a first rinsing liquid discharge line is connected in which a second shut-off valve is included, said cleaning apparatus further provided with a first metering device for introduction of a cleansing additive to said rinsing liquid that has been supplied via said rinsing liquid supply line, said additive being introduced in said rinsing liquid supply line between said rinsing liquid reservoir and said first shut-off valve, the apparatus further being combined with apparatus for automatically milking animals which includes components comprising cleaning means for cleaning the teats and udder of the animal being milked, teat cups and a sensor for sensing the location of the animal's teats for the automated connection of said teat cups to said teats, means for pressurizing rinsing liquid received in said first rinsing liquid discharge line and means for cleaning said teat cups, said sensor, and said cleaning means by spraying pressurized rinsing liquid thereon to which said cleansing additive has been introduced.

* * * * *